United States Patent Office 3,701,746
Patented Oct. 31, 1972

3,701,746
PLASTICIZED NONAQUEOUS METHYL METHACRYLATE POLYMER DISPERSION COATING COMPOSITIONS
William R. Johnson, Blauvelt, N.Y., William R. Sevy, Chattanooga, Tenn., and James E. Weigel, White Plains, and Robert A. Taller, Ossining, N.Y., assignors to Union Carbide Corporation, New York, N.Y.
Filed Apr. 10, 1970, Ser. No. 27,377
Int. Cl. C08f 45/40, 47/20
U.S. Cl. 260—31.6
11 Claims

ABSTRACT OF THE DISCLOSURE

A liquid coating composition producible into films of improved physical properties when applied to a substrate and dried, comprising a dispersion of a methyl methacrylate polymer or copolymer material in an organic liquid, a plasticizer and a high boiling solvent combinable with the plasticizer, wherein the copolymer material further comprises a polymer formed from an ethylenically unsaturated monomer, wherein the organic liquid is one in which particles of the polymer or copolymer are substantially insoluble, wherein the plasticizer is an ester plasticizer characterized by a certain critical volatility, and a certain critical solvency predictable in terms of the ratio of the polar to nonpolar solubility parameters, and wherein the high boiling solvent has a certain critical solvency, preferably the same critical solvency as the ester plasticizer. A metallic pigment may be added to the coating composition to produce a film of excellent metallic glamour.

BACKGROUND OF THE INVENTION

(1) Field of the invention

Figure 1:
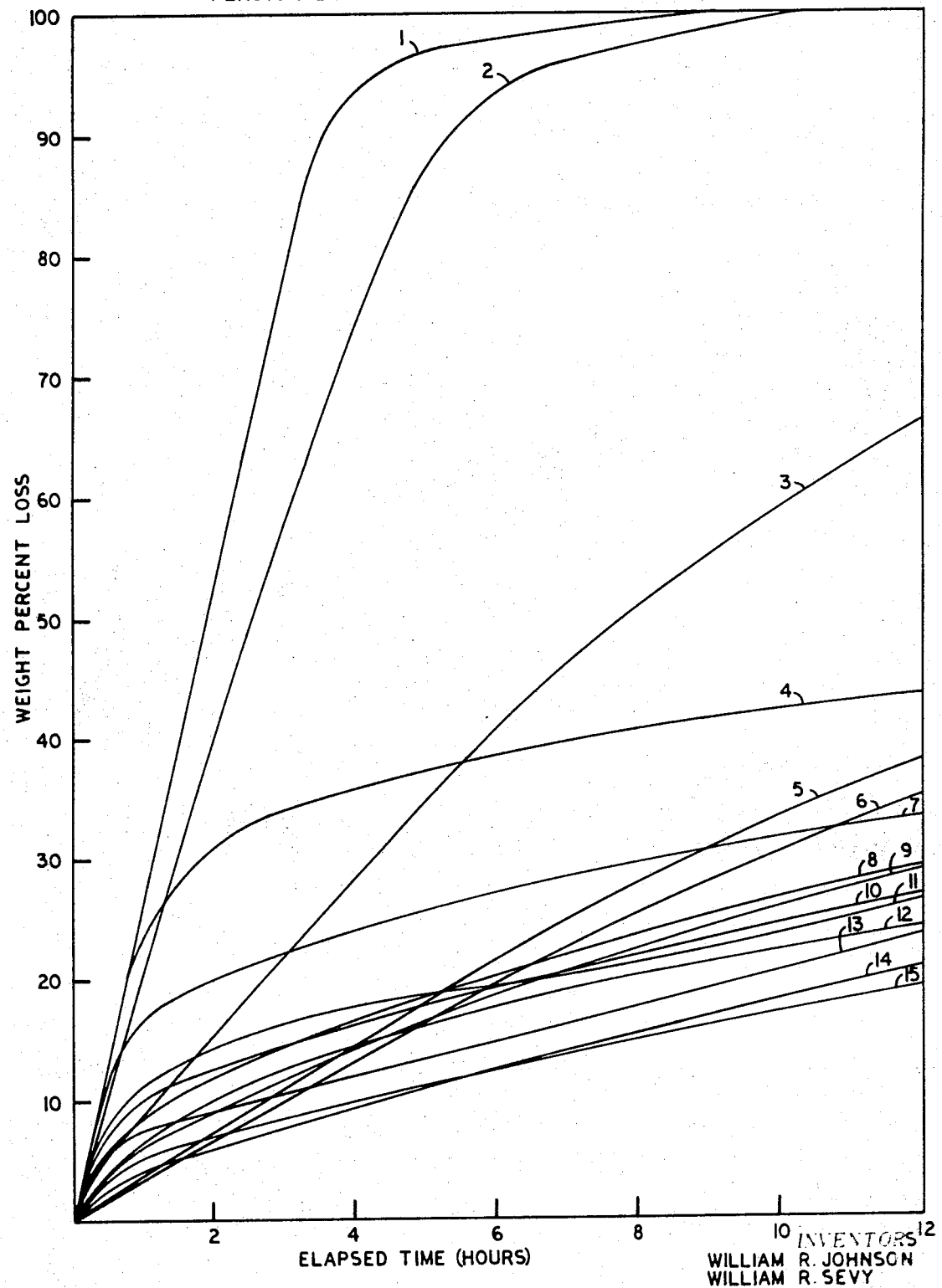

This invention relates to coating compositions based on nonaqueous dispersions of film-forming polymer particles.

(2) Description of the prior art

Coating compositions producible into films having improved physical properties, e.g. free of mudcracking and of acceptable hardness, have been found to be particularly useful for many coating applications and, especially, for automotive topcoats. Normally, a plasticizer is employed in the previously known nonaqueous methyl methacrylate dispersion coatings. However, the plasticizers previously suggested for this application, e.g. such as those disclosed in Netherlands 6,805,574 fail to meet all the critical requirements needed for an effective plasticizer in the methyl methacrylate dispersion type coatings. For the non-aqueous dispersion coating, e.g. a dispersion of a methacrylic polymer in an aliphatic hydrocarbon, it has been found that a suitable plasticizer must have sufficiently low solvency for the methacrylic polymer that it will not swell the polymer particles enough to gel the dispersion at room temperature, but at the same time a suitable plasticizer must have sufficiently high solvency for the polymer that clear coatings free of exudation are obtainable. In addition, the plasticizer must have a certain critically low volatility as will be hereinafter discussed. The combined critical requirements of low volatility, and sufficiently low solvency for the acrylic polymer, in that the plasticizer will not swell the polymer particles enough to gel the dispersion, makes it difficult to select the proper plasticizer. Heretofore, the art has had to search empirically for plasticizers of even modest performance. It would therefore be of tremendous advantage in the field of automotive finishes if a means could be found to determine the suitability of plasticizers by nonempirical methods.

SUMMARY OF THE INVENTION

In accordance with the invention, it has been found that certain physical constants of ester plasticizers correlate with the performance needed in the methacrylic polymer dispersion above described. By appropriate use of such physical constants, not only can an appropriate selection be made from commercially available plasticizers, but more important, a tool is provided whereby new plasticizers can be synthesized having the appropriate properties.

Thus, the critical solvency needed in these plasticizers can be defined as a ratio of polar to nonpolar solubility parameters as hereinafter described, of between about 0.530 and about 0.580.

The plasticizers are further characterized as having a critical volatility such that the weight percent loss of the plasticizer from a porous asbestos bed is no more than about 30 weight percent after a period of about 6 hours at a temperature of up to about 329° F.

In addition, a high boiling solvent combinable with the plasticizer can be used to aid film formation. The solvent used must also have a critical solvency so that a continuous film is formed. This critical solvency can be defined as a ratio of polar to nonpolar solubility parameters, as hereinafter described, of between about 0.4 and about 0.7, and preferably having the same critical solvency as the ester plasticizer.

In accord with the invention, there is provided a coating composition which is producible into films of improved physical properties when it is applied to a substrate and dried. The liquid coating composition comprises a dispersion of methyl methacrylate polymer or copolymer material in an organic liquid, a plasticizer and a high boiling solvent combinable with the plasticizer, wherein the copolymer material further comprises particles of a polymer formed from an ethylenically unsaturated monomer, wherein the organic liquid further comprises one in which particles of the polymer or copolymer are substantially insoluble, wherein the plasticizer further comprises an ester plasticizer characterized by having a neat volatility such that the weight percent loss of plasticizer from a porous asbestos bed is no more than about 30 weight percent after a period of about 6 hours at a temperature of up to about 329° F., and a critical solvency, defined as the ratio of the polar to nonpolar solubility parameters, having a range between about 0.530 and about 0.580 and wherein the high boiling solvent further comprises a solvent material or a blend of solvents having a critical solvency, defined as the ratio of the polar to nonpolar solubility parameters, between about 0.4 and about 0.7 and preferably having the same critical solvency as the ester plasticizer. A metallic pigment is addable to the coating composition to produce a film of excellent metallic glamour.

DESCRIPTION OF THE SPECIFIC EMBODIMENTS

For the purposes of this invention, the polymeric materials dispersed in the organic liquid comprises homopolymers of methyl methacrylate or its copolymers with other monomers having at least one ethylenically unsaturated valence bond. These polymers can be either thermoplastic or thermosetting. Some examples of monomers suitable for preparation of the copolymers include vinyl esters of fatty acids having 1 to 18 carbon atoms including vinyl acetate, vinyl oleate and vinyl stearate. Esters of acrylic acid or of methacrylic acid with alcohols having from 2 to 18 carbon atoms can likewise be employed. More examples of suitable monomers include methyl acrylate, ethyl acrylate or methacrylate, propyl acrylate or methacrylate, isopropyl acrylate or methacrylate, the various butyl acrylates or methacrylates, cyclohexyl acrylate or methacrylate, benzyl acrylate or methacrylate, phenyl acrylate or methacrylate, n-hexyl, n-octyl, t-octyl, dodecyl, hexadecyl, or octadecyl acrylates or methacrylats, acrylonitrile, methacrylontrile, acrylamide, methacrylamide, styrene, α-methyl styrene, vinyl toluenes, acrylic acid, acrylic acid anhydride, methacrylic acid, methacrylic acid anhydride, maleic anhydride, fumaric acid, crotonic acid, allyl acetate, glycidyl methacrylate, t-butylamino ethyl methacrylate, hydroxyalkyl acrylates and methacrylates such as β-hydroxyethyl methacrylate, β-hydroxyethyl vinyl ether, β-hydroxyethyl vinyl sulfide, vinyl pyrrolidone, N,N-dimethylaminoethyl methacrylate. Still other suitable monomers include ethylene, propylene, vinyl chloride, vinyl fluoride, vinylidene fluoride, hexafluoropropylene, chlorotrifluoroethylene, tetrafluoroethylene and diethylaminoethyl methacrylate.

Any polymer or copolymer formed from the above-described monomers is suitable for this invention if it is insoluble in the particular organic liquid being used.

Metallic pigmentation can be added to the dispersed phase which can be any flat metallic flake. Examples of suitable flakes include aluminum flakes, nickel flakes, tin flakes, silver flakes, chromium flakes, stainless steel flakes, gold flakes, copper flakes, and combinations of these.

Organic liquids suitable for use as the dispersing phase can vary widely. In general, the dispersing phase is a volatile organic liquid or a mixture of such liquids. These organic liquids can be acyclic or alicyclic aliphatic hydrocarbons, or naphthenic hydrocarbons. The organic liquids can have a boiling range of from about —50° C. to as high as about 300° C. The boiling point or boiling range of the organic liquids can be chosen as desired for the particular application for which the liquid coating is to be used. Examples of suitable organic liquids include pentane, n-hexane, cyclohexane, n-heptane, n-octane, iso-octane. In addition, commercially available hydrocarbon mixtures can be employed including mineral spirits, gasoline, solvent naphthas of aliphatic and naphthenic character, octane fractions which contain a mixture of octane isomers, etc., and mixtures of these. For a more detailed description of the use of the above solvents, for example in the formation of compositions known as organosols, as described in the above-mentioned Netherlands patent, see U.S. 3,166,524 and U.S. 3,232,903.

As earlier indicated, the ester plasticizers suitable for use in making non-aqueous acrylic dispersion finishes are those having a specified volatility such that the loss of plasticizer from a porous asbestos bed is no more than about 30 weight percent after a period of about 6 hours at a temperature up to about 329° F. Additionally, the ester plasticizer must have a certain low solvency for the acrylic resin, such that the plasticizer will not swell the polymer particles enough to gel the dispersion, but at the same time, it must have a sufficiently high solvency for the polymer that clear coatings free of exudation are obtained. This critical solvency can be defined in terms of the ratio of polar to nonpolar solubility parameters. This ratio has been found to have a value in its broadest range between about 0.530 and about 0.580, a preferred range between about 0.550 and about 0.570 and particularly preferred is that ratio having a value of about 0.565.

Thus, in accord with the present discovery, whether or not a particular plasticizer will come within the scope of the invention will be determined by the following characteristics: (1) solvency, (2) volatility, and ultimately (3) film performance. However, it is to be understood that if the first two requirements are met, then the third will follow naturally therefrom.

A method for determining the solvency, or specifically the compatibility, of a plasticizer with a polymeric dispersion system will be described first.

By means of this invention, solubility parameters are used to predict the compatibility of solvent-polymer and plasticizer-polymer systems. In general, a plasticizer will be compatible with a polymer if their solubility parameters are fairly close. The solubility parameter of a substance is defined as the square root of its cohesive energy density.

$$\delta = \sqrt{E/V}$$

where $\delta$ = solubility parameter
$E$ = molar cohesive energy
$V$ = molar volume The solubility parameters described in this work are derived in part from the use of structural group constants originally developed by Small, P.A., J. Appl. Chem., 3, 71 (1953). The solubility parameter of a compound can be calculated from group constants using the following equation:

$$\delta = \frac{d \Sigma S}{M}$$

where $\delta$ = solubility parameter
$d$ = density, g./cc.
$\Sigma S$ = sum of Small's molar attraction constants
$M$ = molecular weight The molar-attraction constants used in this study were derived from a broad spectrum of compounds whose values were subjected to multiple regression analysis in order to obtain better values for these constants. The group or structural constants are summarized below. For each compound a base value of 135.1 is added to the sum of the molar attraction constants (S).

MOLAR AND POLAR ATTRACTION CONSTANTS

| Group | Bond type | S | P |
|---|---|---|---|
| —CH₃ | Saturated | 148.3 | 0 |
| —CH₂— | do | 131.5 | 0 |
| >CH— | do | 86.0 | 0 |
| >C< | do | 32.0 | 0 |
| CH₂= | Olefin | 126.5 | 32.7 |
| —CH= | do | 121.5 | 29.1 |
| >C= | do | 84.5 | 30.8 |
| —CH= | Aromatic | 117.3 | 30.4 |
| >C= | do | 98.1 | 31.7 |
| —O— | Ether | 1015.0 | 105.6 |
| —O— | Acetal | 115.5 | |
| —O— | Epoxide | 176.2 | |
| —COO— | Ester | 326.6 | 256.2 |
| >C=O | Ketone | 263.0 | 257.0 |
| —CHO | Aldehyde | 292.64 | 242.6 |
| >(CO)₂O | Anhydride | 567.3 | 257.3 |
| —OH⟶ | H-bond OH | 225.8 | |
| —H⟶ | H bond acid | —50.5 | |
| —OH | Primary | 324.6 | (¹) |
| —OH | Secondary | 289.2 | |
| —OH | Tertiary | 390.4 | |
| —OH | Phenolic | 171.0 | |
| NH₂ | Amino 1° | 226.6 | 222.6 |
| —NH— | Amino 2° | 180.0 | |
| >N— | Amino 3° | 61.1 | |
| Ortho sub | | 9.7 | —6.5 |
| Meta sub | | 6.6 | —11.9 |
| Para sub | | 40.3 | —16.6 |
| —C≡N | Nitrile | 354.6 | 345.2 |
| —NCO | Isocyanate | 358.7 | |
| HCON< | Formamide ² | 497.2 | 354.0 |
| —CONH— | Amide ² | 554.7 | |
| —CONH₂ | do | 589.9 | |
| OCONH | Urethane ² | 616.9 | |
| —S— | Thioether | 209.4 | |
| —SH | Thiol | | |
| —SO₂— | Sulfone | | |
| Cl | Primary | 205.1 | 150.0 |
| Cl | Secondary | 208.3 | 154.4 |
| Cl₂ | Twined | 342.7 | 275.0 |
| Cl | Aromatic | 161.0 | 39.8 |
| Br | Primary | 257.9 | |
| Br | Aromatic | 205.6 | 48.6 |
| F | Primary | 41.3 | 35.8 |
| Conjugation | | 23.26 | —9.7 |
| Cis | | —7.13 | |
| Trans | | —13.50 | |
| 4 member ring | | 77.76 | 98.0 |
| 5 member ring | | 20.99 | 41.5 |
| 6 member ring | | —23.44 | 29.8 |
| 7 member ring | | 45.10 | |
| Bicycloheptane ring | | 22.56 | |
| Tricyclodecane ring | | 62.47 | |
| Base value | | 135.1 | |

¹ Not H-bonded.
² Calculated from Data of Bunn, C. W., J. Poly. Sci. 16, 329 (1955).

It has been found that a better predictability of solvency can be obtained if the solubility parameter is separated into two components, a polar solubility parameter and a nonpolar solubility parameter, in the manner described by Blanks and Prausnitz, Ind. and Eng. Chem. Fundamentals 3, No. 1, 1 (1964). The relationship between these terms is as follows:

$$\delta^2 = a^2 + b^2$$

where $\delta$ = total solubility parameter
$a$ = nonpolar solubility parameter
$b$ = polar solubility parameter From Small's molar attraction constants (S) and group polar attraction constants (P), developed from vapor phase chromatographic retention data, shown in the table above, the polar and nonpolar solubility parameters can be calculated by means of these equations:

$$b = \delta\sqrt{\frac{\Sigma P}{\Sigma S}}$$

$$a = \sqrt{\delta^2 - b^2}$$

An example for calculating the polar and nonpolar parameters and the polar-to-nonpolar ratio is shown below for di(2-ethylhexyl)phthalate:

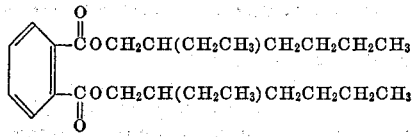

| Group | No. of groups | S | P |
|---|---|---|---|
| CH$_3$ | 4 | 148.3 | 0 |
| CH$_2$ | 10 | 181.5 | 0 |
| CH | 2 | 86.0 | 0 |
| COO ester | 2 | 326.6 | 256.2 |
| —CH=aromatic | 4 | 117.3 | 30.4 |
| —C=aromatic | 2 | 98.1 | 31.7 |
| Ortho substitution | 1 | 9.7 | −6.5 |
| Base value | | 135.1 | |

The S and P values are multiplied by the numbers of groups for each set of values. Each type of value is then summed for the entire molecule. The summed values, the density, and the molecular weight:

$\Sigma S = 3543.6$
$\Sigma P = 690.9$
$d = 0.9784$
$M = 390.544$ are then substituted in the proper equations listed below to give the total solubility parameter ($\delta$), nonpolar parameter (a), polar parameter (b), and the polar/nonpolar ratio (b/a).

$$\delta = \frac{d\Sigma S}{M}$$

$$\delta = 8.88$$

$$b = \delta\sqrt{\frac{\Sigma P}{\Sigma S}}$$

$$b = 3.92$$

$$a = \sqrt{\delta^2 - b^2}$$

$$a = 7.97$$

$$b/a = 0.492$$

As mentioned, it has been found that a suitable plasticizer for a dispersion must have a particular polar-to-nonpolar balance (b/a) in order to be compatible with the dispersion system. This b/a ratio was determined for several Esterdiol-204 [1] bis (alkyl phthalates) which were prepared for laboratory evaluation with a non-aqueous methacrylic dispersion. The results tabulated below in Table I show that only Esterdiol-204 bis(isodecyl phthalate) having a b/a value of 0.565 was suitable for use with the dispersion system. It was the only derivative that had good shelf stability (did not gel the dispersion at room temperature) and was compatible with the baked film.

TABLE I

| Plasticizer | b/a | Compatibility [1] Dispersion | Film |
|---|---|---|---|
| Esterdiol-204 bis (n-butyl phthalate) | 0.672 | Gel | |
| Esterdiol-204 bis (amyl phthalate) | 0.650 | Gel | |
| Esterdiol-204 bis (2-ethylhexyl phthalate) | 0.596 | Gel | |
| Esterdiol-204 bis (isodecyl phthalate) | 0.565 | C | C |
| Esterdiol-204 bis (tridecyl phthalate) | 0.523 | C | I |
| Esterdiol-204 bis (2-tetrahydropyranylmethyl phthalate) | 0.697 | Gel | |

[1] C = Compatible; I = Incompatible.

In accord with the invention requirements, a number of additional plasticizers designed to have a b/a ratio of about 0.565 were synthesized. These, all suitable for use with methacrylic dispersions, are listed below with their respective b/a ratios and laboratory compatibility data (Table II):

TABLE II

| Plasticizer | b/a | Compatibility [1] Dispersion | Film |
|---|---|---|---|
| Ethylene glycol bis (isodecyl phthalate) | 0.568 | C | C |
| Propylene glycol bis (isodecyl phthalate) | 0.561 | C | C |
| Propionyloxyethyl tridecyl phthalate | 0.552 | C | C |
| 2-ethylhexane-1,3-diol/6-hydroxyhexanoic acid/propionic acid (1/3/2 moles) | 0.565 | C | C |
| Esterdiol-204/6-hydroxyhexanoic acid/isopentanoic acid (1/3/2 moles) | 0.577 | C | C |
| Esterdiol-204/phthalic acid/nonanoic acid (3/1.5/2.7 moles) | 0.569 | C | C |
| Acetoxyethyl tridecyl phthalate | 0.564 | C | C |

[1] C = Compatible.

In contrast to prior art plasticizers, e.g. isodecyl benzyl phthalate ("Santicizer" 262) and di(2-methylcyclohexyl) phthalate ("Sextol" phthalate), the invention plasticizers such as those listed in Table II are more efficient, i.e. they can be used at a lower level to obtain equivalent film hardness, as will be more fully described hereinbelow. This results in a significant economic advantage when employing the invention plasticizers in automotive topcoatings for example.

While it will be observed that the aforenoted list of plasticizers had critical solvency values falling within the ranges previously defined, it is also to be noted, in accord with the invention, that in addition to specific solubility requirements, a plasticizer to be operative within the invention must have a certain low volatility, especially when used in automotive topcoat applications. This low volatility has been determined to be of a value such that the loss of plasticizer from a porous asbestos bed is no more than about 30 weight percent after a period of about 6 hours at a temperature up to about 329° F. The relative volatilities of a number of plasticizers falling both within and without the scope of the invention were plotted showing elapsed time versus weight percent loss at a temperature of 329° F. in order to illustrate them visually as well as graphically. This plot is shown in FIG. 1. The weight percent losses were determined relative to an arbitrarily chosen standard di(2-ethylhexyl)phthalate. Weight percent loss of the plasticizers was determined in the following manner. A boat 2 x 4 x 0.5 inches was constructed of 3 mil aluminum foil. A 10 mil, 2 x 4 inch asbestos pad was placed in the boat. The boat containing the asbestos pad was heated at 329° F. for 24 hours or until a constant tare weight was obtained. One and one-half grams of a plasticizer were added to the tared boat and the total weight recorded. The aluminum boat containing the asbestos pad saturated with plasticizer was

[1] 2,2-dimethyl-3-hydroxypropyl 2,2-dimethyl-3-hydroxypropionate.

placed in a low-draft oven at 329° F. Periodically, the boat was removed, cooled, weighed, and the loss of plasticizer recorded. Readings were taken each hour up to eight hours, followed by a final reading at about 22 hours.

Table III below lists the weight percent loss of plasticizers relative to di(2-ethylhexyl)phthalate, after six hours at 329° F.

TABLE III

| | Plasticizer | Weight percent loss at 329° F., 6 hrs. | Relative volatility |
|---|---|---|---|
| 1 | Di(2-ethylhexyl)phthalate | 97.8 | 1.0 |
| 2 | Di(methylcyclohexyl)phthalate-(Sextol phthalate) | 93.9 | 0.96 |
| 3 | Isodecyl benzyl phthalate-(Santicizer 262) | 40.8 | 0.42 |
| 4 | Esterdiol-204 bis (amyl phthalate) | 38.2 | 0.39 |
| 5 | Ethylene glycol bis (isodecyl phthalate) | 21.4 | 0.22 |
| 6 | Propylene glycol bis (isodecyl phthalate) | 19.4 | 0.20 |
| 7 | Esterdiol-204 bis (n-butyl phthalate) | 26.9 | 0.28 |
| 8 | Acetoxyethyl tridecyl phthalate | 21.0 | 0.21 |
| 9 | Esterdiol-2-04 bis (isodecyl phthalate) | 18.8 | 0.19 |
| 10 | Esterdiol-204/6-hydroxyhexanoic acid/ isopentanoic acid (1/3/2 moles) | 20.0 | 0.20 |
| 11 | 2-ethylhexane-1,3-diol/6-hydroxyhexanoic acid/propionic acid (1/3/2 moles) | 19.1 | 0.20 |
| 12 | Esterdiol-204/Phthalic acid/nonanoic acid (3/1.5/2.7 moles) | 17.5 | 0.18 |
| 13 | Propionyloxyethyl tridecyl phthalate | 15.0 | 0.15 |
| 14 | Esterdoil-204 bis (2-tetrahydropyranylmethyl phthalate) | 12.8 | 0.13 |
| 15 | Esterdiol-204 bis (tridecyl phthalate) | 12.3 | 0.13 |

Figure 2:
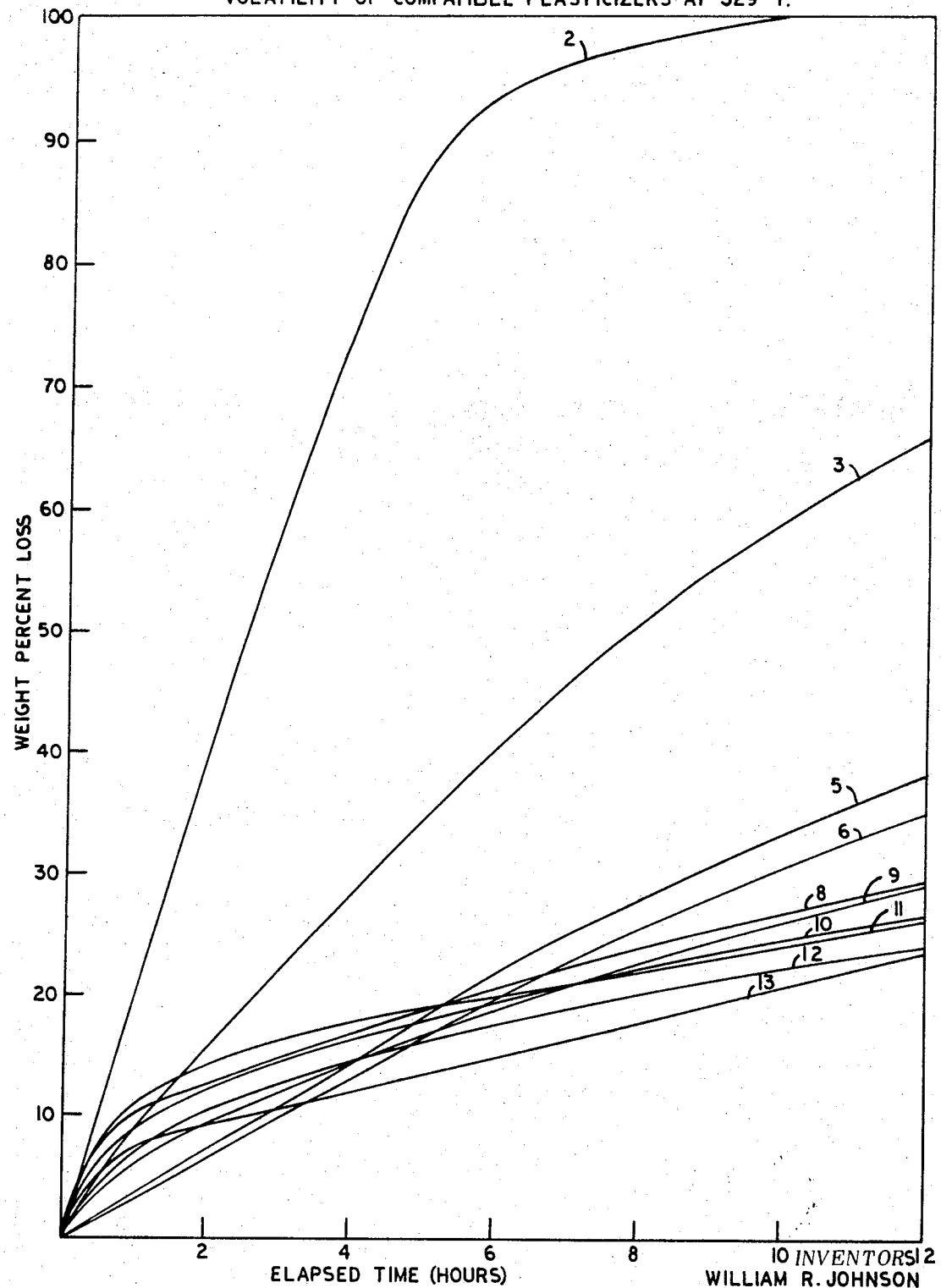

Reviewing FIG. 1, as well as the results of Table III, it will be seen that while a specific plasticizer may have a critical solvency falling within the ranges called for in the present invention, the other critical requirement of the plasticizer, i.e. low volatility, will not necessarily be met. This will be further understood visually and graphically by reference to FIG. 2, wherein two plasticizers are shown, i.e. 2, 3, which meet critical solvency requirements of the invention, i.e. $b/a=0.568$ and $0.564$, respectively, yet do not have the requisite low volatilities called for in the invention. The numbers shown in the first column of Table III identify the plasticizers shown in FIGS. 1 and 2. Further reference to the data of FIGS. 1 and 2 will show that a plasticizer in addition to being compatible with a non-aqueous dispersion, i.e. critical solvency, must have a volatility yielding no more than about a 30 weight percent loss of plasticizer from a porous asbestos bed after a period of about 6 hours at a temperature up to about 329° F. Looking at Table III relative to a specific standard and specific conditions it will be seen that the plasticizer must have a relative volatility of less than 0.3 times that of the standard, i.e. di(2-ethylhexyl)phthalate.

It has also been found that the plasticizers falling within the critical limitations of the invention must also be combined with a critical amount of high boiling solvent so that coatings, e.g. automotive topcoatings, of acceptable film hardness and free of mudcracking [2], will be obtained. Specifically, it was found that at 50 parts per hundred resin (phr.), the invention plasticizers yielded acrylic films that were too soft for use as automotive topcoats, and on the other hand, reduction of plasticizer volume to 30 phr., while giving acceptable film hardness, resulted in discontinuous or mudcracked films.

In accordance with the invention, it was then discovered that at a plasticizer level of between about 10 and 60 phr. and preferably about 30 phr., the inclusion into the coating of a suitable high boiling solvent in amounts between about 10 and 200 phr., preferably about 35 phr. (in order to adjust for the drop in plasticizer volume),

[2] The mechanism of mudcracking may be described as follows: A non-aqueous dispersion, after evaporation of most of the diluent, is made up of a series of close packed spheres. Each sphere is comprised of two concentric spheres, the inner one being the high polymer particle and the outer one being the diluent swollen interfacial agent. If during baking the diluent media is completely evaporated from the interfacial agent before the melt temperature of the polymer is reached, volume contraction of the outer, interfacial agent sphere takes place resulting in discontinuous films or mudcracking.

yielded films free of mudcracking and of acceptable hardness. As indicated earlier, the plasticizers synthesized in accord with the requirements of the invention are more efficient in that they can be used at lower levels to obtain comparable film hardness. The results shown in Table IV below illustrate this.

TABLE IV.—PLASTICIZER EFFICIENCY [1]

| Plasticizer | Phr.[2] | Knoop hardness[3] |
|---|---|---|
| Isodecyl benzyl phthalate | 30 | 20.60 |
| Di(2-methylcyclohexyl)phthalate | 30 | 23.34 |
| Ethylene glycol bis(isodecyl phthalate) | 30 | 16.78 |
| Propylene glycol bis(isodecyl phthalate) | 30 | 17.67 |
| Propionyloxyethyl tridecyl phthalate | 30 | 14.66 |
| Acetoxyethyl tridecyl phthalate | 30 | 15.58 |
| Esterdiol-204 bis(isodecyl phthalate) | 30 | 18.64 |
| Esterdiol-204/phthalic acid/nonanoic acid (3/1.5/2.7 moles) | 30 | 17.77 |
| Esterdiol-204/6-hydroxyhexanoic acid/isopentanoic acid (1/3/2 moles) | 30 | 14.30 |
| 2-ethylhexane-1,3-diol/6-hydroxyhexanoic acid/propionic acid (1/3/2 moles) | 30 | 13.00 |
| Unplasticized film (control) | | 23.44 |

[1] Paint was prepared according to Example 1 below, sprayed onto primed steel panels and baked according to Examble 1.
[2] Plasticizer concentration expressed as, parts, per hundred parts resin.
[3] $K_{10}$ grams.

The results of the table immediately above, compare the Knoop hardness ratings of the invention plasticizers with two previously known plasticizers, isodecyl benzyl phthalate and di(2-methylcyclohexyl)phthalate, and also with an unplasticized film as a control. It is to be noted that the plastitcizers made in accordance with the invention all have Knoop values considerably lower than the prior art plasticizers and the unplasticized film. This is particularly significant and important in the automotive industry, since preferred automotive top coatings have Knoop values from about 12 up to about 15. It is to be noted that isodecyl benzyl phthalate, di(2-methylcyclohexyl)phthalate and the unplasticized film all have values of 20 and over.

It has also been found that the high boiling solvents used in combination with these plasticizers have to meet certain critical solubility requirements. At room temperature the high boiling solvent must not disturb the dispersion, and at the bake temperature, it should assist in the formation of a continuous film. Those high boiling solvents suitable for use have $b/a$ ratios between about 0.4 and about 0.7 and preferably $b/a$ ratios close to that of the preferred values for the plasticizers, i.e. between about 0.550 and 0.580. Typical illustrative solvents falling within the scope of the invention along with their $b/a$ ratios are shown in Table V below.

TABLE V

| Solvents: | $b/a$ |
|---|---|
| Ethylene glycol monoethyl ether acetate | 0.632 |
| Ethylene glycol monobutyl ether acetate | 0.556 |
| 2-ethylhexyl acetate | 0.428 |
| Diethylene glycol monobutyl ether acetate | 0.569 |
| 2-ethylhexane-1,3-diol diacetate | 0.572 |
| Diethylene glycol diacetate | 0.747 |
| n-Butyl 6-acetoxyhexanoate | 0.562 |
| Diethylene glycol diacetate (45%) / 2-ethylhexyl acetate (55%) | 0.571 |
| Diethylene glycol monobutyl ether acetate (50%) / Diethylene glycol diacetate (20%) / 2-ethylhexyl acetaate (30%) | 0.561 |

Particularly recommended solvents have been found to be diethylene glycol monobutyl ether acetate $b/a=0.569$, 2-ethylhexane-1,3-diol diacetate $b/a=0.572$, and n-butyl 6-acetoxyhexanoate $b/a=0.562$. Typical plasticizer/high boiling solvent combinations employed in non-aqueous dispersion coatings in accord with the invention are summarized below in Table VI.

TABLE VI

| | Phr. | |
|---|---|---|
| Esterdiol 204 bis (isodecyl phthalate) | b/a=0.565 | 30 |
| Diethylene glycol monobutyl ether acetate | b/a=0.569 | 35 |
| Ethylene glycol bis (isodecyl phthalate) | b/a=0.568 | 30 |
| 2-ethylhexane-1,3-diol diacetate | b/a=0.572 | 35 |
| Propylene glycol bis (isodecyl phthalate) | b/a=0.560 | 30 |
| Diethylene glycol monobutyl ether acetate | b/a=0.569 | 35 |
| Propionyloxyethyl tridecyl phthalate | b/a=0.552 | 30 |
| Diethylene glycol monobutyl ether acetate | b/a=0.569 | 35 |
| 2-ethylhexane-1,3-diol/6-hydroxyhexanoic acid/propionic acid (1/3/2 moles) | b/a=0.565 | 30 |
| 2-ethylhexane-1,3-diol diacetate | b/a=0.572 | 35 |
| Esterdiol-204/6-hydroxyhexanoic acid/isopentanoic acid (1/3/2 moles) | b/a=0.577 | 30 |
| 2-ethylene-1,3-diol diacetate | b/a=0.572 | 35 |
| Esterdiol-204/phthalic acid/nonanoic acid (3/1.5/2.7 moles) | b/a=0.569 | 30 |
| 2-ethylhexane-1,3-diol diacetate | b/a=0.572 | 35 |
| Acetoxyethyl tridecyl phthalate | b/a=0.564 | 30 |
| n-Butyl 6-acetoxyhexanoate | b/a=0.562 | 35 |

All the above plasticizer/high boiling solvent combinations yielded films of acceptable hardness and free of mud-cracking. While it is preferred to employ plasticizers having a $b/a$ value within the limits previously set by the invention, it has been found that the $b/a$ values are additive and thus, regardless of the combination of plasticizers, i.e. those falling below and above the limits of the invention, if the sum of the $b/a$ values is for example 0.565, then the plasticizers will be operative within the method of the invention. The same is true for the high boiling solvents.

Generally, the liquid coating compositions of the invention are produced in the following manner. A pigment grind is prepared by milling the deired plasticizer, the desired pigment and a pigment dispersant. The resultant grind is then let down with a methacrylic dispersion containing hydrocarbon medium, a high boiling solvent and a leveling agent. This is accomplished by premixing the hydrocarbon and the high boiling solvent and adding the same slowly to the pigment grind with stirring. Thereafter, the dispersion and leveling agent, preblended if desired, are added slowly to the mixture of hydrocarbons, high boiling solvent and grind to form a base coating.

The base coating is then thinned for spray application with a suitable solvent and the thinned dispersion is then sprayed onto a substrate material and baked at the desired temperature. Satisfactory metallic finishes can be prepared by including a metallic paste, in the base coating using methods known to the art. This is particularly desirable for automotive topcoat applications.

The invention will be better understood in conjunction with the following specific illustrative examples.

EXAMPLE 1

A pigment grind was prepared having the following composition:

| | Percent wt. |
|---|---|
| Rutile titanium dioxide | 14.14 |
| Pigment dispersant (acrylic solution polymer) 17.3% non volatile | 3.66 |
| Esterdiol-204 bis(isodecyl phthalate) | 9.30 |

The grind was let down with a poly(methyl methacrylate) dispersion as follows:

| | Percent wt. |
|---|---|
| Hexane/heptane 70/30 wt. | 4.23 |
| Diethylene glycol monobutyl ether acetate | 10.83 |
| Poly(methyl methacrylate) dispersion 54% non-volatile | 57.27 |
| L 45/100 silicone, 2% in xylol | 0.57 |
| | 100.00 |

The hexane/heptane portion and the high boiling solvent portion were premixed and were added slowly to the pigment grind with stirring. The dispersion and L 45/100 Silicon solution, available commercially from Union Carbide Corp., (preblended, if desired) were then added slowly with stirring to form a base coating.

This base coating was then thinned for spray application 7.0/1.0 (paint/thinner, by weight) with:

| | P.b.w. |
|---|---|
| Amsco Ink Oil 10–450 | 100 |
| Ethylene glycol monoethyl ether acetate | 20 |

This thinned dispersion was sprayed onto a primed metal panel and baked at 300° F. for thirty minutes. The resultingly baked finish had film performance properties exhibiting high gloss, suitable hardness and good weatherability, which is particularly desirable in automotive topcoatings.

EXAMPLE 2

The procedure of Example 1 was repeated with the exception that the plasticizer added was ethylene glycol bis (isodecyl phthalate) and the high boiling solvent was 2-ethylhexane-1,3-diol diacetate. The properties of the baked finish were the same as those of Example 1.

EXAMPLE 3

The procedure of Example 1 was repeated with the exception that the plasticizer added was propylene glycol bis(isodecyl phthalate) and the high boiling solvent was diethylene glycol monobutyl ether acetate. The properties of the baked finish were the same as those of Example 1.

EXAMPLE 4

The procedure of Example 1 was repeated with the exception that the plasticizer added was propionyloxyethyl tridecyl phthalate and the high boiling solvent was diethylene glycol monobutyl ether acetate. The properties of the baked finish were the same as those of Example 1.

EXAMPLE 5

The procedure of Example 1 was repeated with the exception that the plasticizer added was 2-ethylhexane-1,3-diol/6-hydroxyhexanoic acid/propionic acid (1/3/2 moles) and the high boiling solvent was 2-ethylhexane-1,3-diol diacetate. The properties of the baked finish were the same as those of Example 1.

EXAMPLE 6

The procedure of Example 1 was repeated with the exception that the plasticizer added was Esterdiol-204/6-hydroxyhexanoic acid/isopentanoic acid (1/3/2 moles) and the high boiling solvent was 2-ethylhexane-1,3-diol diacetate. The properties of the baked finish were the same as those of Example 1.

EXAMPLE 7

The procedure of Example 1 was repeated with the exception that the plasticizer added was Esterdiol-204/phthalic acid/nonanoic acid (3/1.5/2.7 moles) and the high boiling solvent was 2-ethylhexane-1,3-diol diacetate. The properties of the baked finish were the same as those of Example 1.

EXAMPLE 8

The procedure of Example 1 was repeated with the exception that the plasticizer added was acetoxyethyl tridecyl phthalate and the high boiling solvent was n-butyl 6-acetoxyhexanoate. The properties of the baked finish were the same as those of Example 1.

What is claimed is:

1. A coating composition producible into films of improved physical properties when applied to a substrate and dried comprising a dispersion of methyl methacrylate homopolymer or copolymer with an ethylenically unsaturated monomer or mixture thereof in an organic liquid medium, a plasticizer which is an ester of 2,2-dimethyl-3-hydroxypropyl 2,2 - dimethyl - 3 - hydroxypropionate, and a high boiling solvent combinable in the coating composition with the plasticizer, wherein said organic liquid is one in which said polymer or copolymer is substantially insoluble, wherein said plasticizer is characterized by having a volatility such that the loss of plasticizer will be no more than about 30 weight percent after a drying period of about 6 hours at a drying temperature of up to about 329° F., said plasticizer being further characterized by having a solvency definable as the ratio of the polar to nonpolar solubility parameters of said plasticizer, said ratio being in the range between about 0.530 and about 0.580 and wherein said high boiling solvent is characterized by having a solvency definable as the ratio of the polar to non polar solubility parameters of said high boiling solvent, said ratio being in the range between about 0.4 and about 0.7, said plasticizer being present in said coating composition in amounts between about 10 and about 60 parts per hundred of said polymer or copolymer and said high boiling solvent being present in said coating composition in amounts between about 10 and about 200 parts per hundred of said polymer or copolymer.

2. A composition according to claim 1 wherein said methyl methacrylate polymer comprises a copolymer formed from methyl methacrylate and an ethylenically unsaturated monomer selected from the group consisting of acrylic acid, methacrylic acid, esters of acrylic and methacrylic acid with alcohols having two to eighteen carbon atoms, styrene, methyl acrylate, dimethylaminoethyl methacrylate and diethylaminoethyl methacrylate.

3. A composition according to claim 1 wherein the ratio of the polar to nonpolar solubility parameters of said plasticizer is between about 0.550 and about 0.570 and the ratio of the polar to nonpolar solubility parameters of said high boiling solvent is between about 0.550 and about 0.580.

4. A composition according to claim 3 wherein said plasticizer is 2,2-dimethyl-3-hydroxypropyl 2,2-dimethyl-3-hydroxypropionate bis(isodecyl phthalate).

5. A composition according to claim 1 wherein said plasticizer is 2,2-dimethyl - 3 - hydroxypropyl 2,2-dimethyl - 3 - hydroxypropionate/6 - hydroxyhexanoic acid/isopentanoic acid in a ratio of 1 mole to 3 moles to 2 moles, respectively.

6. A composition according to claim 3 wherein said plasticizer is 2,2 - dimethyl - 3 - hydroxypropyl 2,2-dimethyl - 3 - hydroxypropionate/phthalic acid/nonanoic acid in a ratio of 3 moles to 1.5 moles to 2.7 moles, respectively.

7. A composition according to claim 1 wherein said plasticizer is 2,2 - dimethyl - 3 - hydroxypropyl 2,2-dimethyl - 3 - hydroxypropionate/bis(isodecyl phthalate) and the high boiling solvent is diethylene glycol monobutyl ether acetate.

8. A composition according to claim 1 wherein said plasticizer is 2,2 - dimethyl - 3 - hydroxypropyl 2,2-dimethyl - 3 - hydroxypropionate/6 - hydroxyhexanoic acid/isopentanoic acid in a ratio of 1 mole to 3 moles to 2 moles, respectively, and the high boiling solvent is 2-ethylhexane-1,3-diol diacetate.

9. A composition according to claim 1 wherein said plasticizer is 2,2 - dimethyl - 3 - hydroxypropyl 2,2-dimethyl - 3-hydroxypropionate/phthalic acid/nonanoic acid in a ratio of 3 moles to 1.5 mole to 2.7 moles, respectively, and the high boiling solvent is 2 ethylhexane-1,3-diol diacetate.

10. A composition according to claim 3 wherein the ratio of polar to nonpolar solubility parameters of said plasticizer is about 0.565 and the ratio of polar to nonpolar solubility parameters of said high boiling solvent is also about 0.565.

11. A composition according to claim 1 wherein said plasticizer is present in amounts of about 30 parts per hundred of said polymeric material and said high boiling solvent is present in amounts of about 35 parts per hundred of said polymeric material.

References Cited

UNITED STATES PATENTS

| 3,000,747 | 9/1961 | Martin et al. | 260—31.6 |
|---|---|---|---|
| 3,370,032 | 2/1968 | Potter | 260—31.6 |
| 3,326,707 | 6/1967 | Huber | 106—316 |
| 3,095,388 | 6/1963 | Osmond et al. | 260—34.2 |
| 3,166,524 | 1/1965 | Schmidle et al. | 260—34.2 |
| 3,218,287 | 11/1965 | Schmidle et al. | 260—34.2 |
| 3,232,903 | 2/1966 | Schmidle et al. | 260—34.2 |
| 3,317,635 | 5/1967 | Osmond | 260—34.2 |
| 3,399,163 | 8/1968 | Cousens et al. | 260—34.2 |
| 3,433,753 | 3/1969 | Farkas et al. | 260—34.2 |

ALLAN LIEBERMAN, Primary Examiner

U.S. Cl. X.R.

260—31.4 R, 31.8 G, 31.8 H, 31.8 C, 32.2, 475 R, 475 P